Patented Aug. 19, 1952

2,607,690

UNITED STATES PATENT OFFICE 2,607,690

PREPARATION OF GREEN COFFEE

William R. Johnston, Bronxville, and Herbert Elliott Foote, Chappaqua, N. Y., assignors to Standard Brands Incorporated, New York, N. Y., a corporation of Delaware No Drawing. Application January 24, 1951, Serial No. 207,658

8 Claims. (Cl. 99—65)

1

This invention relates to a process for preparing green coffee from the coffee cherry and more particularly to an enzyme process for treating whole cherries without removing skin and pulp (including the mucilaginous layer) from the coffee cherries before drying.

According to U. S. Patent No. 2,526,873 coffee cherries from which the skin and a portion of the pulp have been removed mechanically and on which the part of the pulp known as mucilage still remains are treated with pectic enzymes in order to facilitate removal of the mucilage layer without resort to slow fermentation. In that process the cherries are passed through a pulping machine, the pulped beans are treated with pectic enzymes in order to digest the remaining mucilage quickly (in a few hours rather than by fermentation which requires 24 to 48, as commonly practiced in the industry), then washed to remove the digested mucilage and dried. The pulped beans treated with pectic enzymes may also be dried directly without removal of the digested mucilage. Where an abundance of water and the necessary equipment are available this process is capable of economically producing green coffee of high quality.

But in many coffee-producing locations neither suitable water supplies nor equipment for pulping and washing are available. In these places pulping, fermentation and washing are omitted and the whole cherry is simply dried. The dried skin, pulp, mucilage and parchment layers are removed together in one operation to produce the so-called "natural" green coffee.

According to the invention whole cherries are treated soon after picking with pectic enzymes or mixtures of pectic enzymes with cellulases, hemicellulases and gummases and then dried directly or after washing. It has been found that such treatment with enzymes results in an improvement in the quality of the coffee. This process is much simpler than that described in the patent referred to above in that it avoids the pulping operation. It may also avoid the washing operation.

In general, we have found that the use of enzymes is of advantage in producing improved coffee when used on whole cherries in various stages of ripeness, whether in a green state approaching ripeness, fully ripe, overripe and soft, or in the further advanced stage of being partially dried on the tree. In addition, we have found that the most marked effects in improving coffee quality are produced when the skin of the whole cherry has been broken or scarified either by natural cracking or by mechanical bruising. Accordingly, the preferred method of practicing the invention is first to insure scarification by bruising the cherries by any convenient means and then apply the enzymes in dry powder form to the cherry mass, mixing the latter to insure even distribution of the enzymes. After standing a few hours, usually overnight, the cherries are dried in the usual way either in the sun on a patio or in a mechanical dryer.

The enzyme digests and loosens the pulp and has the same effect on the mucilage if allowed to act long enough. We prefer to continue the action of the enzyme until substantially all of the mucilage is digested. The treated cherries may be dried directly but they are preferably washed first to remove any loose pulp and mucilage.

The invention is illustrated by the following examples:

Example 1.—A batch of bruised green cherries was divided into two 20 kg. lots. 50 g. of a pectic enzyme preparation was mixed thoroughly with one lot. No enzyme was added to the other lot. Both lots were then allowed to stand overnight, after which they were washed and dried in the sun. The green beans were separated by hulling and then roasted and ground. Cup tests showed that the coffee treated with enzymes was of distinctly better quality than the untreated coffee.

The same results were obtained in parallel experiments on the same scale, carried out in the same way on ripe cherries and on cherries partially dried on the tree.

Example 2.—A batch of bruised partially dried ripe cherries was divided into two 20 kg. lots. One lot was treated with 25 g. of a pectic enzyme preparation and 25 g. of a preparation containing cellulases, hemicellulases and gummases. No enzyme was added to the other lot. Both lots were allowed to stand overnight and were then dried in the sun without washing. The green beans were separated by hulling and then roasted and ground. Cup tests showed that the coffee treated with the enzymes was of distinctly better quality than the untreated coffee.

We claim:

1. In a process of preparing green coffee the steps of scarifying or bruising whole coffee cherries and then treating them with pectic enzymes.

2. A process as claimed in claim 1 wherein the cherries are in a green state approaching ripeness.

3. A process as claimed in claim 1 wherein the cherries are fully ripe.

4. A process as claimed in claim 1 wherein the cherries are partially dried on the tree.

5. A process as claimed in claim 1 wherein the treatment with pectic enzymes is continued until the pulp is digested.

6. A process as claimed in claim 1 wherein the treatment with pectic enzymes is continued until the pulp and the mucilage are digested.

7. A process of preparing green coffee which comprises scarifying or bruising whole coffee cherries, treating them with pectic enzymes until the pulp is digested, washing the cherries to remove loose pulp and then drying the washed cherries.

8. A process of preparing green coffee which comprises scarifying or bruising whole coffee cherries, treating them with pectic enzymes until the pulp and mucilage are digested, washing the cherries to remove loose pulp and mucilage and then drying the washed cherries.

WILLIAM R. JOHNSTON.
HERBERT ELLIOTT FOOTE.

REFERENCES CITED

The following references are of record in the file of this patent:

UNITED STATES PATENTS

| Number | Name | Date |
|---|---|---|
| 1,737,071 | Birnie | Nov. 26, 1929 |
| 2,526,873 | Johnston et al. | Oct. 24, 1950 |